US010352153B2

(12) United States Patent
Bell et al.

(10) Patent No.: US 10,352,153 B2
(45) Date of Patent: Jul. 16, 2019

(54) ADVANCED PERFORATION MODELING

(71) Applicant: GEODynamics, Inc., Millsap, TX (US)

(72) Inventors: Matthew Bell, Houston, TX (US);
John Hardesty, Weatherford, TX (US);
Sashi Gunturu, Katy, TX (US)

(73) Assignee: GEODYNAMICS, INC., Millsap, TX (US)

(*) Notice: Subject to any disclaimer, the term of this patent is extended or adjusted under 35 U.S.C. 154(b) by 183 days.

(21) Appl. No.: 14/775,977

(22) PCT Filed: Mar. 14, 2014

(86) PCT No.: PCT/US2014/028987
§ 371 (c)(1),
(2) Date: Sep. 14, 2015

(87) PCT Pub. No.: WO2014/153084
PCT Pub. Date: Sep. 25, 2014

(65) Prior Publication Data
US 2016/0024911 A1 Jan. 28, 2016

Related U.S. Application Data

(60) Provisional application No. 61/789,708, filed on Mar. 15, 2013, provisional application No. 61/785,826, filed on Mar. 14, 2013.

(51) Int. Cl.
E21B 47/10 (2012.01)
E21B 43/117 (2006.01)
G01V 99/00 (2009.01)

(52) U.S. Cl.
CPC ............ *E21B 47/10* (2013.01); *E21B 43/117* (2013.01); *G01V 99/005* (2013.01)

(58) Field of Classification Search
CPC ...... E21B 47/10; E21B 43/117; G01V 99/005
USPC .......................................................... 702/12
See application file for complete search history.

(56) References Cited

U.S. PATENT DOCUMENTS

| 4,554,975 | A | * | 11/1985 | Vann | E21B 23/00 |
| | | | | | 166/297 |
| 4,932,239 | A | * | 6/1990 | Regalbuto | F42B 35/00 |
| | | | | | 73/12.08 |
| 5,771,984 | A | * | 6/1998 | Potter | E21B 7/14 |
| | | | | | 175/14 |
| 6,644,099 | B2 | * | 11/2003 | Bell | E21B 29/02 |
| | | | | | 73/12.01 |
| 9,080,431 | B2 | * | 7/2015 | Bell | E21B 43/117 |

(Continued)

OTHER PUBLICATIONS

European Patent Office, International Search Report for PCT/US2014/028987 dated Jan. 12, 2015.

(Continued)

*Primary Examiner* — Dzung Tran
(74) *Attorney, Agent, or Firm* — Patent Portfolio Builders PLLC

(57) ABSTRACT

A technique is provided for modeling flow simulations at downhole reservoir conditions and rock formations after performing wellbore perforations. By utilizing these flow simulations, a user may be able to simulate and compare different scenarios, thereby facilitating a more effective, profitable, and realistic choice of perforating systems and operating conditions.

12 Claims, 4 Drawing Sheets

(56) References Cited

U.S. PATENT DOCUMENTS

| | | | | |
|---|---|---|---|---|
| 2005/0209866 A1* | 9/2005 | Veeningen | ............. | G06Q 10/06 705/7.28 |
| 2006/0131074 A1* | 6/2006 | Calhoun | ............... | E21B 49/006 175/50 |
| 2009/0217739 A1 | 9/2009 | Hardesty et al. | | |
| 2010/0137169 A1* | 6/2010 | Pope | ......................... | C08F 8/00 507/205 |
| 2011/0146982 A1* | 6/2011 | Kaminsky | ............. | E21B 43/247 166/272.2 |
| 2011/0257944 A1* | 10/2011 | Du | ........................ | E21B 43/267 703/2 |
| 2011/0271751 A1* | 11/2011 | Brooks | ................... | E21B 43/11 73/152.07 |
| 2012/0191354 A1* | 7/2012 | Caycedo | ............... | E21B 47/022 702/9 |
| 2014/0007667 A1* | 1/2014 | Haggerty | ................ | E21B 49/00 73/152.11 |
| 2014/0318866 A1* | 10/2014 | Lewis | ................. | E21B 41/0092 175/40 |
| 2014/0366620 A1* | 12/2014 | Haggerty | ................ | E21B 49/00 73/152.02 |
| 2015/0134314 A1* | 5/2015 | Lu | ........................... | E21B 43/00 703/10 |

OTHER PUBLICATIONS

The International Bureau of WIPO, International Preliminary Report on Patentability for PCT/US2014/028987, dated Sep. 15, 2015.

Lang, Zhan, et al., "SPE 151800 Perforated Completion Optimization using a New, Enhanced and Integrated Perforating Job Design Tool," pp. 1-14, Feb. 17, 2012. Retrieved from Internet: https://www.onepetro.org/download/conference-paper/SPE-151800-MS?id=conference-paper%2FSE-151800-MS [retrieved by ISA/EPO on Dec. 11, 2014].

* cited by examiner

Integrated Penetration Model Example
Figure 6
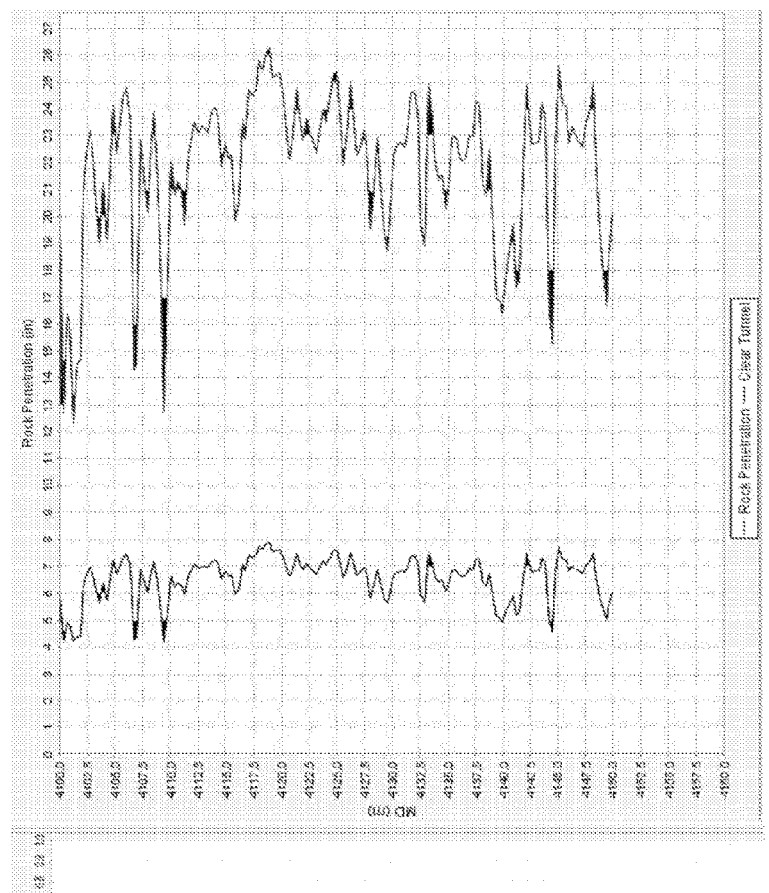
Figure 5
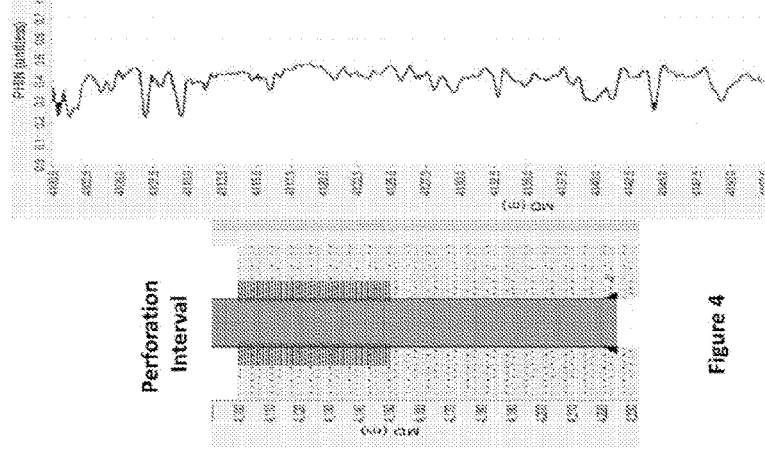
Figure 4

US 10,352,153 B2

ADVANCED PERFORATION MODELING

CROSS-REFERENCE TO RELATED APPLICATIONS

This application is a 371 National Stage Application claiming priority to PCT Application No. PCT/US2014/028987 filed Mar. 14, 2014, which claims priority to U.S. provisional application No. 61/785,826 filed Mar. 14, 2013 and U.S. provisional application No. 61/789,708 filed Mar. 15, 2013, the technical disclosures of which are hereby incorporated by reference.

BACKGROUND OF THE INVENTION

Field of the Invention

Embodiments of the present invention generally relate to methods and apparatus for modeling flow simulations at downhole reservoir conditions and rock formations after performing wellbore perforations.

Description of the Related Art

In the drilling of oil and gas wells, a wellbore is formed using a drill bit that is urged downwardly at a lower end of a drill string. After drilling a predetermined depth, the drill string and bit are removed, and the wellbore is lined with one or more strings of casing or a string of casing and one or more strings of liner. An annular area is thus formed between the string of casing/liner and the formation. A cementing operation is then conducted in order to fill the annular area with cement. The combination of cement and casing/liner strengthens the wellbore and facilitates the isolation of certain areas of the formation behind the casing to prevent the undesirable flow of hydrocarbons between rock formations, which may, for example, contaminate aquifers, or to surface.

After a well has been drilled and completed, it is desirable to provide a flow path for hydrocarbons from the surrounding formation into the newly formed wellbore. To accomplish this, perforations are created through the casing/liner string at one or more depth(s) which equate to the anticipated depth(s) of hydrocarbon bearing strata. Predictive models are used to select an appropriate perforating system and perforating depth(s) for the wellbore.

SUMMARY

In one embodiment, a method of determining inflow of fluid enabled by a perforating system includes obtaining log data for a wellbore parameter; determining a rock penetration value using the wellbore parameter data and a stressed rock test data; determining a clear tunnel value using the rock penetration value and the wellbore parameter data; and determining an inflow using the rock penetration value and the clear tunnel value.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 illustrates an exemplary wellbore having a perforation interval between 4,100 m and 4,150 m.

FIG. 5 illustrates an exemplary porosity log over the perforation interval of FIG. 4.

FIG. 6 illustrates the rock penetration value and clear tunnel measurement over the perforation interval of FIG. 4.

DETAILED DESCRIPTION

In order to produce hydrocarbon fluids from subterranean formations, a borehole is drilled from the surface down into the desired formations. Typically, cylindrical casing is placed and cemented into the borehole, thereby defining a hollow wellbore. In order for the hydrocarbon fluids to flow from the surrounding formations into the wellbore and up to the surface, it is necessary to perforate the casing. This is typically done using a perforating gun, a downhole tool that detonates explosive charges at selected locations in order to form holes in the casing.

Because the fluids in the formation are under pressure, a choice must be made whether to perforate the well with the bottom-hole pressure in the wellbore lower or higher than the formation pressure. The former condition is referred to as "underbalanced" and the latter condition is referred to as "overbalanced."

Figure 1:
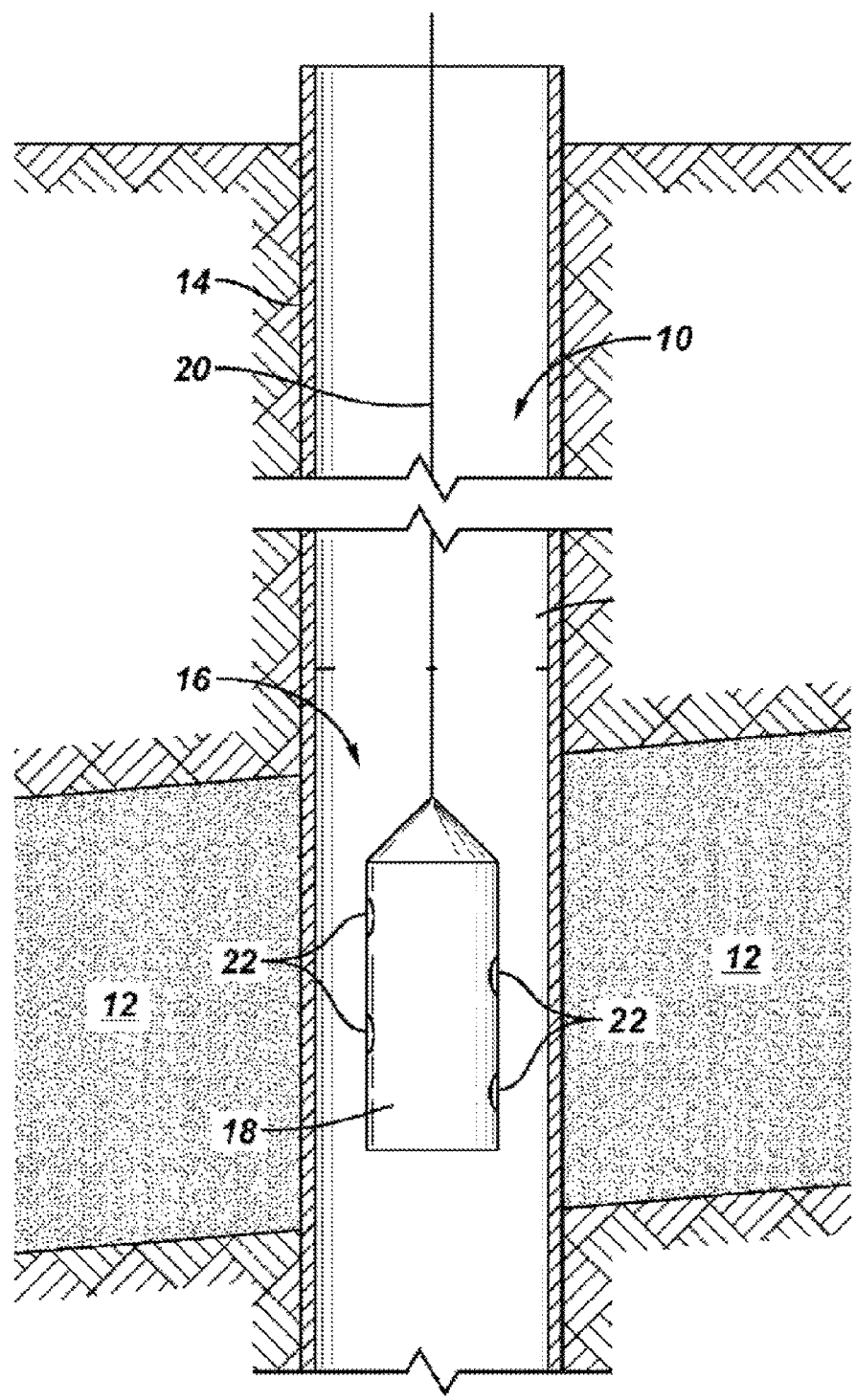
FIG. 1 is a schematic diagram of a perforating system of the present invention, prior to detonation of the perforating charges.

FIG. 1 shows a schematic of a perforating system. A borehole 10 has been drilled from the surface down through subterranean formations 12 that contain hydrocarbon formation fluids, namely oil and/or gas. A generally cylindrical casing 14 lines the wall of the borehole, defining the wellbore 16. A perforating gun 18 has been lowered into the well on a wireline 20. The perforating gun includes at least one, and usually several explosive perforating charges 22. These charges are oriented such that when they are detonated, the force of the explosion will be primarily directed outward toward the casing (e.g., horizontally outward in FIG. 1). Detonation is triggered by a signal delivered through a control line from the surface (not shown in the figures).

Figure 2:
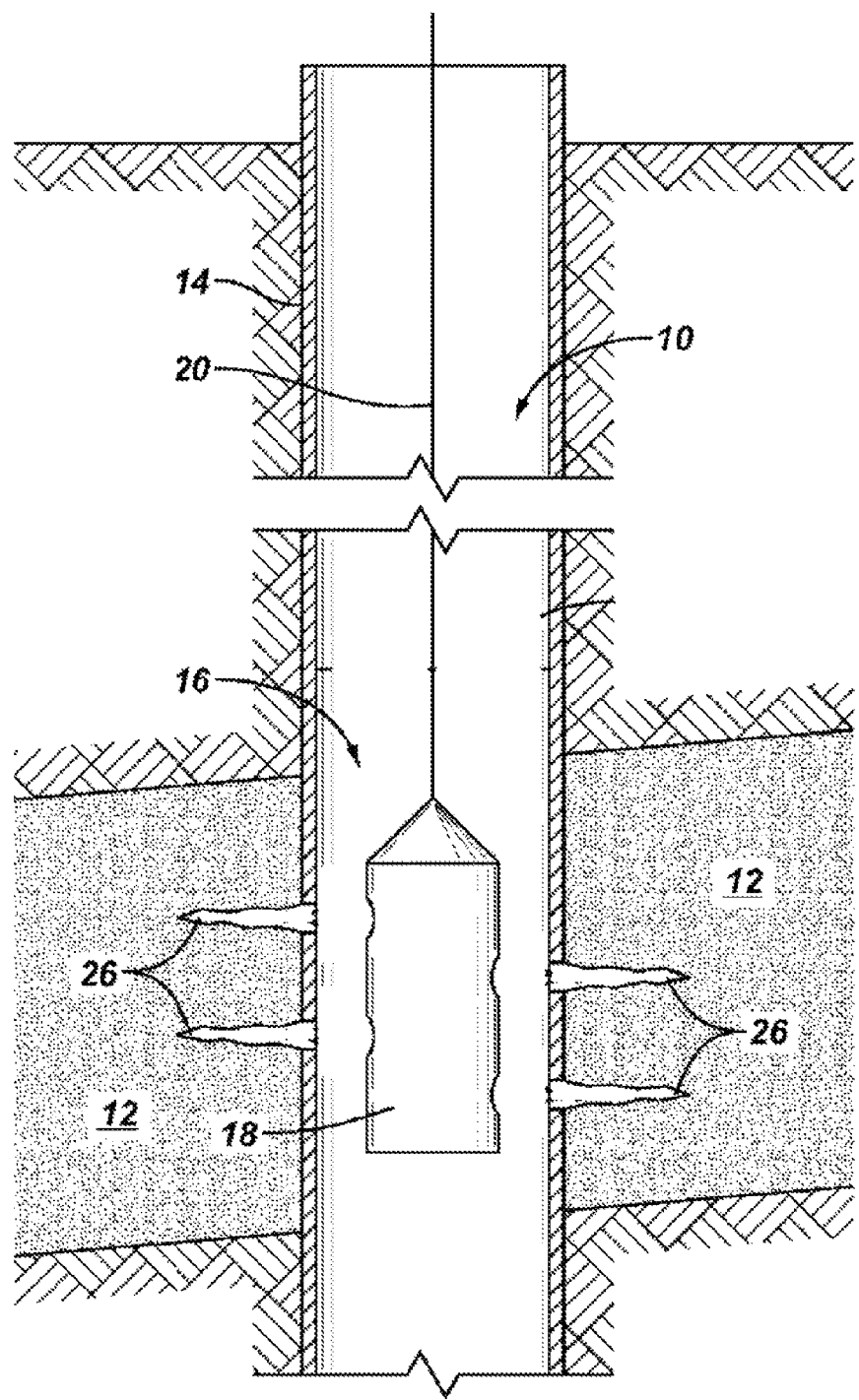
FIG. 2 is a schematic diagram of a perforating system of the present invention, after detonation of the perforating charges.

When the explosive perforating charges are detonated, perforations 26 are formed in the casing, as shown in FIG. 2. Explosive shaped charges have been used to perforate oil and gas wells. These small explosive devices create metallic "jets" traveling at several km/sec, perforating steel casing, cement, and formation rock. Typically, multiple charges are configured in a perforating "gun," and initiated in rapid succession by a high explosive detonating cord, which has been initiated by a detonator.

The primary objective of perforating a cased wellbore is to establish efficient flow communication with the reservoir. The key perforating parameters which influence reservoir deliverability include number of shots per depth interval, angular arrangement of the shots relative to the axis of the wellbore, depth of penetration (DoP) into the rock formation, perforation tunnel diameter, the nature of any permeability-impaired ("crushed") zone which remains surrounding the perforation tunnels, rock type, rock permeability, rock porosity, uniaxial compressive strength (UCS) of the rock, vertical stress acting on the rock as the result of overlying rock formations, reservoir pressure, reservoir temperature, fluid behavior under varying pressure, volume, and temperature (PVT) conditions, in situ gas-oil ratio (GOR) behavior, drainage radius of the well, and the radius of any damaged zone surrounding the wellbore as the result of drilling operations.

Shot density and phasing are fixed system parameters and, therefore, their values at downhole conditions are known. However, downhole values of perforation tunnel depth, diameter, and crushed zone characteristics cannot be known with certainty. These quantities must be estimated with predictive models. By utilizing these predictive models, a user may be able to simulate and compare different scenarios and make an appropriate choice for a perforating system and operating conditions. Therefore the accuracy of these predictive models is an essential ingredient in the accuracy of any well productivity or injectivity prediction.

Depth of penetration prediction of a downhole shaped charge (DoP prediction) has historically been largely determined by correlation to shaped charge penetration measured into unstressed concrete targets under ambient conditions at surface. This depth is then used to estimate an equivalent depth in the downhole rock. The actual reservoir strength relative to the downhole rock is then considered and a correction is applied. Actual downhole stress (overburden and pore pressure) results in additional corrections. Additional effects such as water clearance, casing thickness, cement thickness, etc. are applied as additional corrections. However, reliance on unstressed concrete performance leads to inaccurate results. For example, unstressed concrete performance may not be indicative of downhole conditions in a wellbore for perforating. Shaped charges that are optimized to penetrate more effectively in unstressed concrete are typically not optimized for penetrating effectively into stressed rock. Therefore, cement-based correlations prove insufficient for flow simulations at downhole reservoir conditions and (rock) formations. As a result, choice of perforating equipment for wells in specific regions may be based on limited simulations and prior success (e.g., word of mouth) in that region.

In addition to being determined by unstressed concrete performance, downhole shaped charge DoP prediction has historically been determined by reservoir properties that are averaged over a perforating interval. Examples of such averaged reservoir properties generally include permeability, porosity, UCS, fluid PVT data, and in situ GOR behavior. Determining the downhole shaped charge DoP prediction based on averaged reservoir properties may also lead to inaccurate results, particularly due to the fact that any of the averaged reservoir properties may vary significantly over the perforating interval.

Certain embodiments of the present invention provide techniques for accurately modeling flow simulations at downhole reservoir conditions and rock formations after performing wellbore perforations. By utilizing these accurate flow simulations, a user may be able to simulate and compare different scenarios, thereby facilitating a more effective, profitable, and realistic choice of perforating systems and operating conditions.

Rather than determining the downhole shaped charge DoP prediction based on averaged reservoir properties over a perforating interval, multiple DoP predictions may be made over the perforating interval, such as on a foot by foot scale, and preferably at the greatest depth resolution supported by available data typically one-half to one foot intervals between logging tool measurements. Determining the DoP prediction on a foot by foot scale may lead to more accurate flow simulation models (e.g., flow contributions across a perforation interval). In one embodiment, DoP prediction on a foot by foot scale may be made using wellbore logs that have been collected during the drilling of the wellbore (e.g., wireline logs, MWD logs, LWD logs, or mud logs). The wellbore logs reflect property variations on a foot scale. A log-based approach captures variation of rock strength and permeability across the perforation interval and, therefore, provides a more accurate flow contribution on a foot by foot scale. Examples of various wellbore logs that may be used include gamma ray logs, neutron logs, density logs, sonic logs, and resistivity logs. FIG. 4 illustrates an exemplary wellbore having a perforation interval between 4,100 m and 4,150 m.

In another embodiment, seismic data that has been collected prior to drilling may be used for making the DoP predictions. Seismic data gives an estimate that is useful for rock strength estimation that can serve as a bound. 3D/4D seismic data may be useful for simulation of re-perforations and for understanding declining production by reviewing permeability changes. Lateral rock strength variation may be seen from seismic analysis (e.g., after calibration). Examples of various seismic data that may be used include data dealing with an estimated rock strength, permeability changes (e.g., using time-lapse ("4D") seismic data), and lateral variation of rock properties for a particular depth. Seismic data may also be available for multi-well perforation simulations. In another embodiment, seismic data may be used in combination with wellbore logs to refine DoP predictions.

Using the wellbore logs and/or the seismic data, and optionally along with drilling data (e.g., rate of penetration, drilling mud density, and drilling mud properties), one or more of the following reservoir properties may be calculated on a foot by foot scale: permeability, porosity, rock strength, vertical stress, reservoir pressure, reservoir temperature, fluid PVT data, in situ GOR behavior, and damaged zone radius. Determining the DoP prediction on a foot by foot scale based on the above-mentioned parameters may lead to more accurate flow simulation models. Having the ability to compare flow simulations for different perforating systems may assist in the choice of an appropriate perforating system for particular downhole reservoir conditions.

Figure 3:
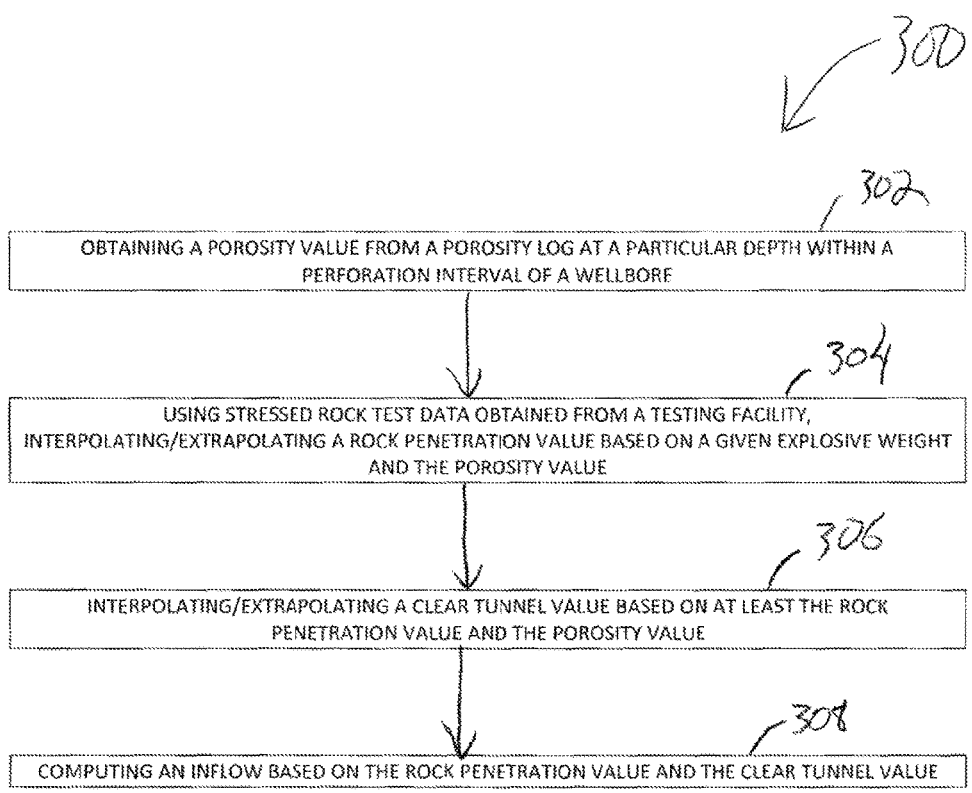
FIG. 3 illustrates example operations for a rock penetration model for accurately modeling flow simulations at downhole reservoir conditions and rock formations after performing wellbore perforations, according to an embodiment of the present invention.

For certain embodiments, the wellbore logs described above may be used along with a rock penetration model for accurately modeling flow simulations at downhole reservoir conditions and rock formations after performing wellbore perforations, as illustrated in FIG. 3. As described above, the logs, seismic data, or drilling data show foot by foot variation. FIG. 5 illustrates an exemplary porosity log over the perforation interval of FIG. 4. For a given perforation interval and a selected gun system, the actual rock penetration may be analyzed for a particular depth, as will be described further herein. In one embodiment, at step 302, for each depth within the perforation interval (e.g., 1 foot), the porosity at that depth may be obtained from a porosity log. At step 304, using stressed rock test data obtained from a testing facility, the rock penetration value maybe determined such as by interpolation or extrapolation of experimental rock penetration data based on a given explosive weight and the porosity value at the depth within the perforation interval. FIG. 6 illustrates the rock penetration value over the perforation interval of FIG. 4. In other words, a rock penetration value may be determined based on the rock test data and actual reservoir conditions such as porosity obtained from a wellbore log at a particular depth, without depending on correlations from unreliable test data gathered using unstressed concrete targets. Also, experimental tests in the flow labs have suggested rock-penetration models are useful to simulate the effects and benefits of reactive shaped charges. The clear tunnel of the penetrated formation is a controlling parameter for flow prediction using Darcy's equation.

At step 306, a clear tunnel measurement of the rock penetration may be determined. Clear tunnel measurements reflect the actual tunnel that is open for flow. Conventional cement penetration models assume that the entire perforated tunnel is open for flow, which is usually not the case. Because the fluids in the formation are under pressure, the well may be perforated with the bottom-hole pressure in the wellbore lower or higher than the formation pressure. The former condition is referred to as "underbalanced" and the latter condition is referred to as "overbalanced." Using the selected underbalanced or overbalanced pressure condition, the determined rock penetration value described above, and porosity, the clear tunnel value may be determined such as by interpolation or extrapolation of experimental clear tunnel measurements obtained from stressed rock tests. FIG. 6 also illustrates the clear tunnel measurement over the perforation interval of FIG. 4.

As a result, an effective rock penetration value and clear tunnel value may be provided for a given gun system under selected reservoir conditions at a particular depth. At step 308, by using the determined rock penetration value and clear tunnel value, the inflow value may be computed for a particular perforating system. Having the ability to compare flow simulations for different perforating systems may assist in the choice of an appropriate perforating system for particular downhole reservoir conditions.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The above discussion is meant to be illustrative of the principles and various embodiments of the present invention. Numerous variations and modifications will become apparent to those skilled in the art.

While the foregoing is directed to embodiments of the present invention, other and further embodiments of the invention may be devised without departing from the basic scope thereof, and the scope thereof is determined by the claims that follow.

The invention claimed is:

1. A method of perforating a wellbore in a subterranean formation, the method comprising the steps of:
    accessing a data log of wellbore parameters, the wellbore parameters including porosity data collected at intervals along the wellbore;
    calculating a rock penetration value at the intervals along the wellbore, based on (i) experimental rock penetration data, (ii) a given explosive weight associated with a gun system, and (iii) the porosity data of the wellbore;
    determining a clear tunnel value associated with the rock penetration value, at the intervals along the wellbore, based on (1) a bottom-hole pressure condition of the wellbore, (2) the calculated rock penetration value, and (3) the porosity data;
    determining expected fluid flows, at the intervals along the wellbore, based on the calculated rock penetration value and the clear tunnel value;
    comparing the expected fluid flows determined at a range of the intervals, for plural perforating gun systems;
    selecting a perforating gun system from the plural perforating gun systems for the wellbore, based on the step of comparing;
    lowering the selected perforating gun system inside a casing that lines the wellbore; and
    perforating the casing and the wellbore by detonating explosive charges of the selected perforating gun system so that a fluid flows from the subterranean formation into the casing through holes made in the casing by the explosive charges.

2. The method of claim 1, wherein the bottom-hole pressure condition is underbalanced.

3. The method of claim 1, wherein the bottom-hole pressure condition is overbalanced.

4. The method of claim 1, wherein determining the rock penetration value comprises interpolating or extrapolating the experimental rock penetration value based on the given explosive weight and the porosity data.

5. The method of claim 1, wherein the clear tunnel value reflects an actual tunnel that is opened for flow by a shaped charge.

6. The method of claim 1, wherein determining the clear tunnel value is obtained from interpolation or extrapolation of experimental clear tunnel measurements obtained from stressed rock tests.

7. A method of perforating a wellbore in a subterranean formation, the method comprising:
    collecting porosity data at given intervals along the wellbore during drilling;
    calculating a rock penetration value, at the given intervals, based on (i) experimental rock penetration data, (ii) a given explosive weight associated with a gun system, and (iii) the porosity data of the wellbore;
    determining a clear tunnel value associated with the rock penetration value, at the intervals along the wellbore, based on (1) a bottom-hole pressure condition of the wellbore, (2) the calculated rock penetration value, and (3) the porosity data;
    determining expected fluid flows, between the subterranean formation and the wellbore, at the intervals along the wellbore, based on the calculated rock penetration value and the clear tunnel value;
    selecting a perforating gun system from the plural perforating gun systems for the wellbore, based on the expected fluid flows;
    lowering the selected perforating gun system inside a casing that lines the wellbore; and perforating the casing and the wellbore by detonating explosive charges of the selected perforating gun system so that a fluid flows from the subterranean formation into the casing through holes made in the casing by the explosive charges.

8. The method of claim 7, wherein the bottom-hole pressure condition is underbalanced.

9. The method of claim 7, wherein the bottom-hole pressure condition is overbalanced.

10. The method of claim 7, wherein determining the rock penetration value comprises interpolating or extrapolating the experimental rock penetration value based on the given explosive weight and the porosity data.

11. The method of claim 7, wherein the clear tunnel value reflects an actual tunnel that is opened for flow by a shaped charge.

12. The method of claim 7, wherein determining the clear tunnel value is obtained from interpolation or extrapolation of experimental clear tunnel measurements obtained from stressed rock tests.

* * * * *